March 17, 1925.  C. J. Z. FANBERG  1,530,250
TRANSMISSION MECHANISM
Filed March 8, 1923
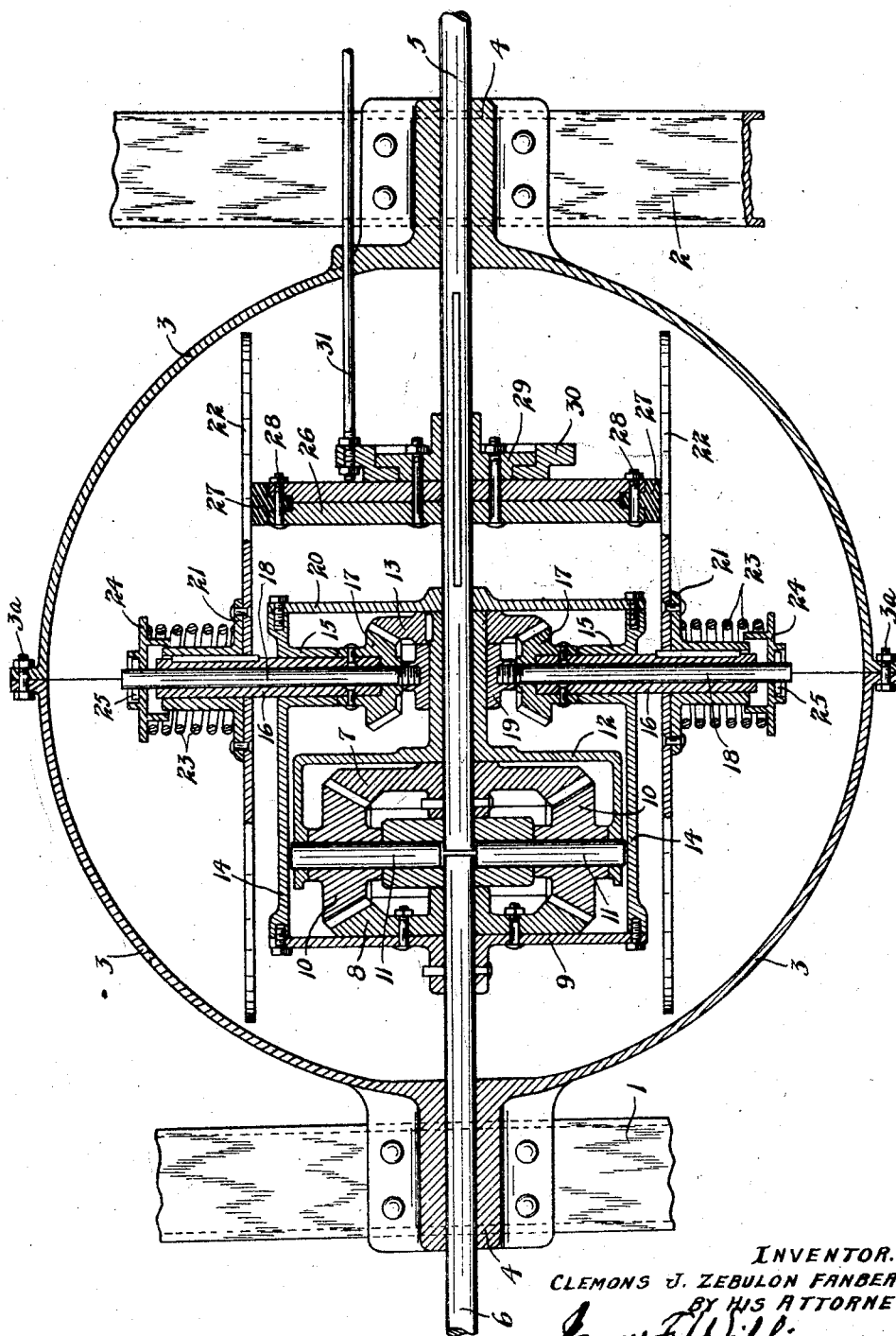
INVENTOR.
CLEMONS J. ZEBULON FANBERG.
BY HIS ATTORNEY.
James F. Williamsoy Patented Mar. 17, 1925.

1,530,250

UNITED STATES PATENT OFFICE.

CLEMONS J. ZEBULON FANBERG, OF KERKHOVEN, MINNESOTA.

TRANSMISSION MECHANISM.

Application filed March 8, 1923. Serial No. 623,776.

*To all whom it may concern:*

Be it known that I, CLEMONS J. ZEBULON FANBERG, a citizen of the United States, residing at Kerkhoven, in the county of Swift and State of Minnesota, have invented certain new and useful Improvements in Transmission Mechanism; and I do hereby declare the following to be a full, clear, and exact description of the invention, such as will enable others skilled in the art to which it appertains to make and use the same.

This invention relates to a transmission device or gearing, and while said transmission device could be used in any application where one shaft is to be variably driven by another, it is more particularly designed to be used on a vehicle such as a modern automobile or truck.

As is well known, it is desirable in such vehicles to have a plurality of gear speeds for propelling the vehicle. It is customary to provide several such speeds for the forward motion of the vehicle and to have at least one speed for reverse and it is also customary to have a neutral position for the transmission or one in which the motor runs without actuating the vehicle driving mechanism.

It is an object of this invention to provide a transmission connecting the shafts which includes a differential mechanism and an adjustable friction means adapted to influence the action of the differential mechanism and to vary the relative speed of said shafts.

It is also an object of the invention to provide a transmission mechanism such as above mentioned in which a second differential mechanism is used connected to the first mentioned differential mechanism, which second differential mechanism drives friction means for engagement with friction means movable on and rotatable with one of the shafts whereby the relative speed of the shafts is controlled.

It is more specifically an object of the invention to provide a pair of co-axial spaced shafts having oppositely facing gears secured thereto with which meshes one or more planetary pinions, thus forming the first differential, said planetary pinions being carried in a member journaled on one of the shafts and having a portion with a gear thereon with which latter gear one or more pinions engage. The last mentioned pinions are carried by a frame secured to and rotating with one of the shafts and said pinions, in turn, are secured to and rotate friction disks, with which disks a friction wheel rotatable on the other of said shafts engages to vary the relative speed of said shafts in one direction, place the transmission mechanism in neutral position and to reverse and vary the reverse speed of said shafts.

These and other objects and advantages of the invention will be fully set forth in the following description made in connection with the accompanying drawings in which like reference characters refer to the same parts, and in which the single figure is a central horizontal section taken axially of the shafts.

Referring to the drawings, spaced portions of the vehicle frame to which the invention is applied are illustrated as 1 and 2, to which portions are bolted, or otherwise secured, the ends of casing sections 3 provided with bearing hubs 4 from which extend the attaching flanges which are secured to the frame members 2. The sections 3 are secured together in tight relation by headed and nutted bolts $3^a$.

Extending into the casing formed by sections 3 and journaled in one of the hubs 4 is a shaft 5 and journaled in the other bearing 4 and also extending into the casing in co-axial relation with the shaft 5 is a shaft 6, the axis of said shafts being substantially in the diameter of the casing 3. One of the shafts 5 and 6 will be a driving shaft and while either of said shafts might serve as a driving shaft, from the following description the shaft 5 will be designated as the driving shaft, which, in the particular arrangement would be connected to the driving motor.

The shaft 5 has secured adjacent one end thereof, a beveled gear 7 and a similar beveled gear 8 facing oppositely to the gear 7 is secured to the shaft 6. Said gear 7 is shown as having a hub pinned to the shaft 5 while the gear 8 is illustrated as being bolted to a plate 9 which, in turn, has a hub pinned to the shaft 6. A purality of beveled pinions 10 are arranged to mesh with the gears 7 and 8 and are journaled on short shafts 11 secured at their ends in alined bearings formed in the yoke or spider member 12. The member 12 extends about the gear 7 and is provided with a sleeve journaled on the shaft 5 and said sleeve has secured about its end, a gear 13. The plate or disk 9 which is secured to the gear 8 is bolted to a frame member or shell 14 enclosing the yoke 12, which shell has inwardly projecting hubs 15 thereon. Journaled in the hubs 15 are oppositely extending sleeves 16, the inner ends of which are secured in any suitable manner, such as by the rivets shown, to pinions 17, which pinions are oppositely disposed and arranged to mesh with the gear 13. Extending through the sleeve 16 and the front portion of the pinions 17 are oppositely extending shafts 18 secured in rigid relation with a hub 19 surrounding the sleeve on member 12, said shafts being illustrated as having threaded ends screwed into the hub 19. The shell member 14 is preferably made in the form of a cylinder and has a portion at its end remote from the plate 9 adapted to have bolted thereto a plate 20 having a central hub journaled on the shaft 5. The shell 14 with its end plates 9 and 20 may thus be formed as a closed casing which, if desired, may be arranged to contain oil. Sleeves 16 have secured to their outer ends, hub-equipped plates 21 to which are riveted or otherwise secured, comparatively large friction disks 22. Coiled springs 23 surround the members 21 and are confined between the same and caps 24 having short outwardly projecting hubs enclosing pins 25 extending through the shaft 18. The springs 23 are placed under compressive stress and tend to move the plates 21 and disks 22 toward the shafts 5 and 6.

A friction wheel 26 is provided formed of a pair of superposed circular disks recessed at their edges to receive a member of frictional material, such as fiber, said plates being held together and the frictional portion 27 clamped in position by headed and nutted bolts 28. The wheel 26 has secured to one side a flanged collar 29 comprising a holding means for a second flanged collar or ring 30 having a central recess receiving the collar 29. A rod 31 has its threaded end secured through the flange of collar 30 by suitable nuts and said rod extends through the casing formed by sections 3 and constitutes an adjusting means for the wheel 26, said wheel being slidable on the shaft 5 to which it is splined.

In the operation of the device, the shaft 5 will be driven and will turn the gear 7. If the yoke 12 were held stationary, the gear 8 would be driven through the pinions 12 and the shaft 6 turned at the same speed as the shaft 5. On the other hand, if the yoke 12 were permitted to turn very freely, the pinions 10 would merely run around on the gear 8 and the shaft 6 would not be driven. The speed transmitted to shaft 6 will therefore depend upon the resistance to rotation encountered by the member 12. As this member 12 and its sleeve tend to turn, the gear 13 will be rotated and will rotate the pinions 17, thus rotating the disks 22. These disks, it will be noted, are held in firm frictional engagement with the periphery of wheel 26, which wheel is rotated at the same speed as shaft 5, owing to its splined connection therewith. It will be noted that the disks 22 are turned through the member 12 in the same direction as the wheel 26 tends to turn them. There will thus be a circular line on said disks, which, when the same is engaged by the wheel 26, will run at substantially the same speed on the periphery of said wheel so that there is no friction between the disks and wheel tending to influence the rotation of either. When the wheel 26 is in this position, the member 12 will simply be revolved, together with the pinions 10 and the gear 8 will not be driven nor will the shaft be driven. This position on the disk 22 is located substantially at the intersection therewith of the bisector of the angle between the axes of shafts 5 and 18. This is therefore the neutral position of the wheel 26 in its adjustment by the rod 31. If the wheel 26 now be moved out toward the edge of the disks 22, the rotation of said disks will be retarded, as will the rotation of the member 12 and the pinions 10 about the axis of shafts 5 and 6. This action will speed up the rotation of gear 8 and shaft 6 so that the further the wheel 26 is moved toward the edge of disk 22, the greater will be the speed transmitted to the shaft 6 from the shaft 5. If the wheel 26 be moved inwardly of the disks from its neutral point, it will tend to rotate said disks at greater speed than they are rotated by the gear 13. The disk will therefore be turned not only by the gear 13 through the member 12 but will also be speeded up by the action of the wheel 26. This will tend to increase the rotatable speed of the member 12 and the same will then rotate faster than it would rotate if loose for free rotation. This increased revolution will traverse the pinions 10 around the gear 8 and they will drive gear 8 so that the shaft 6 will be driven in the same direction to the shaft 5. The further the wheel 26 is moved toward the center of the disk 22 the greater will be the reverse speed of shaft 6. If the speed of rotation of member 12 is greater than the speed of rotation of gear 7 pinions 10 will drive gear 8 at varying speeds in the same direction as gear 7, the speed depending upon the speed of rotation of member 12. If the speed of rotation of member 12 is slower than the rotation of gear 7 then pinions 10 will drive gear 8 in an opposite direction to gear 7 and at speeds depending on the speed of member 12. The drive with the wheel 26 inward of this neutral position will usually be used in the reverse drive of a vehicle. It is not usually desired to have a great range of reverse speeds so that the device is arranged for a smaller travel inward from its neutral position than in its outward travel therefrom. It will thus be seen that the wheel 26 acts as a sort of a governor and by its frictional engagement with the disks 22, determines the speed which will be taken off by the shaft 6. It will be noted that owing to the fact that the disk 9 and gear 8 are secured together, and secured to the shaft 6, that the casing or shell 14 with its end plates 9 and 20, together with the parts carried thereby will be bodily rotated about the shafts 5 and 6.

From the above description it is seen that applicant has provided a transmission mechanism including a simple differential construction which is governed by a frictional means for varying the relative speed between the driving and the driven shaft. The structure of the device is comparatively simple and all of the parts can be easily made and assembled. The transmission can be conveniently enclosed, as shown, by the casing sections 3 and thus protected from all dirt and outside substances. If desired, the casing sections 3 may be arranged to hold oil or oil can only be carried in the shell member 14, if preferred. The disk wheel 26 will have a periphery of hard fiber or some other material commonly used on such friction wheels and the force of engagement of this wheel with the disk 22 can be adjusted as desired by the selection of the spring 23. The transmission is very compact and adapted to be applied to practically all makes of automobiles, including tractors, and to various other machines and machine tools.

It will, of course, be understood that various changes may be made in the form, details, arrangement and proportions of the parts without departing from the scope of applicant's invention, which, generally stated, consists in the matter shown and described and set forth in the appended claims.

What is claimed is:

1. A transmission mechanism having in combination, a driving shaft, a driven shaft, a beveled gear secured to one of said shafts, a similar oppositely disposed gear secured to the other of said shafts, pinions meshing with said gears, a member carrying said pinions and revoluble on one of said shafts, a gear driven by said member, a pinion driven by said last mentioned gear, a flat friction disk rotatable with said last mentioned pinion and disposed parallel to said shafts, a friction wheel engaging said disk and slidable on said driving shaft, and a spring engaging said disk on the side remote from said shafts urging it toward said friction wheel, and a rod movable substantially parallel with said shafts for shifting said friction wheel.

2. A transmission mechanism having in combination, a pair of spaced co-axial shafts, one of which is a driving shaft, oppositely facing gears on said shafts, a planetary pinion meshing with said gears, a member on which said pinion is carried journaled on one of said shafts, a gear on said member and rotated thereby, a frame secured to the other shaft and rotatable therewith, a gear carried by said frame and meshing with said gear on said member, a flat friction disk carried by said frame and secured to said last mentioned gear and a friction wheel carried on said first mentioned shaft and adjustable thereon engaging said friction disk to control the relative speed of said shafts and resilient means carried by said frame urging said disks against said wheel.

3. A transmission mechanism having in combination, a pair of spaced co-axial shafts, one of which is a driving shaft, oppositely facing beveled gears on said shafts, planetary beveled pinions meshing with said gears, a yoke member on which said pinions are carried journaled on one of said shafts and having a gear secured thereto, a frame secured to the other shaft and journaled on said first mentioned shaft and said yoke member oppositely extending shafts secured in said frame, sleeves rotatable on said shafts, gears at one end of said sleeves meshing with said gear on said yoke member, friction disks carried adjacent the other ends of said sleeves and a friction wheel movable on said first mentioned shaft to engage said disks.

4. The structure set forth in claim 3, and springs between said disks and plates secured adjacent the ends of said shafts adapted to hold said disks in engagement with said friction wheel.

In testimony whereof I affix my signature.

CLEMONS J. ZEBULON FANBERG.